United States Patent [19]

Crouch

[11] Patent Number: 5,603,398
[45] Date of Patent: Feb. 18, 1997

[54] REGULATING ASSEMBLY AND CONVEYOR

[75] Inventor: G. William Crouch, Colchester, Conn.

[73] Assignee: B&B Equipment, Inc., Middletown, Conn.

[21] Appl. No.: 383,951

[22] Filed: Feb. 6, 1995

Related U.S. Application Data

[62] Division of Ser. No. 150,688, Nov. 10, 1993, Pat. No. 5,411,129.

[51] Int. Cl.⁶ ................................................. B65G 47/26
[52] U.S. Cl. ...................... 198/459.2; 198/419.1
[58] Field of Search ........................ 198/419.1, 463 H, 198/459.1, 460.1

[56] References Cited

U.S. PATENT DOCUMENTS

| | | | |
|---|---|---|---|
| 1,667,991 | 5/1928 | Russell | 198/495.2 X |
| 2,612,815 | 10/1952 | Britt | 198/419.1 X |
| 3,193,078 | 7/1965 | Amenta et al. . | |
| 3,326,349 | 6/1967 | Pettis et al. . | |
| 3,599,789 | 8/1971 | Kurczak . | |
| 3,848,746 | 11/1974 | Van der Winden . | |
| 4,003,465 | 1/1977 | Bauer . | |
| 4,060,165 | 11/1977 | Bauer . | |
| 4,066,163 | 1/1978 | Rowekamp . | |
| 4,277,061 | 7/1981 | Nagel et al. . | |
| 4,616,745 | 10/1986 | Hartness . | |
| 4,723,649 | 2/1988 | Hartness et al. . | |

FOREIGN PATENT DOCUMENTS

| | | | |
|---|---|---|---|
| 2252271 | 7/1975 | France . | |
| 0882670 | 7/1953 | Germany | 198/459.2 |

Primary Examiner—James R. Bidwell
Attorney, Agent, or Firm—Pepe & Hazard

[57] ABSTRACT

A dual motion divider for articles moving along a conveyor belt has an intake lane defining member with elongated parallel spaced partition walls defining an intake lane for articles carried on an associated conveyor belt. The member is pivotable at its article receiving end in an arc extending transversely of the partition walls and movable at its other end along an axis parallel to the partition walls. The divider also has a discharge lane defining member with a multiplicity of elongated parallel spaced partition walls defining a plurality of discharge lanes for the articles. The discharge lane defining member is pivotable at its article discharging end in an arc extending transversely of the partition walls and movable at its other end along an axis parallel to the partition walls. The movable ends of the members are adjacent each other and a drive assembly is connected to each of the lane defining members to move concurrently the movable ends in opposite directions and bring the intake lane into alignment with a predetermined one of the discharge lanes. A regulating assembly is provided adjacent a point along the intake lane to permit a predetermined number of articles to pass a point in the intake lane before the intake lane is moved into alignment with a predetermined discharge lane.

3 Claims, 10 Drawing Sheets

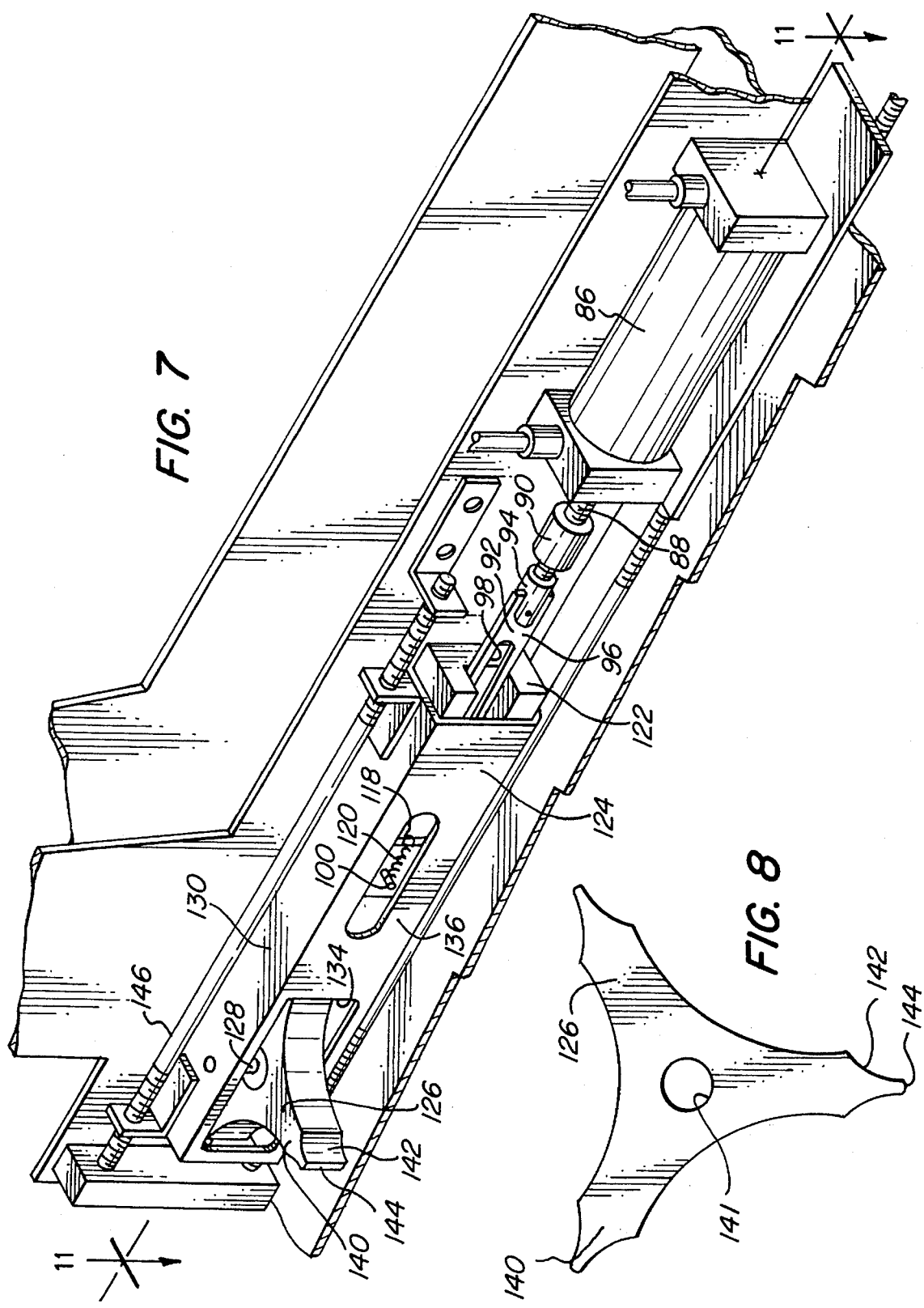

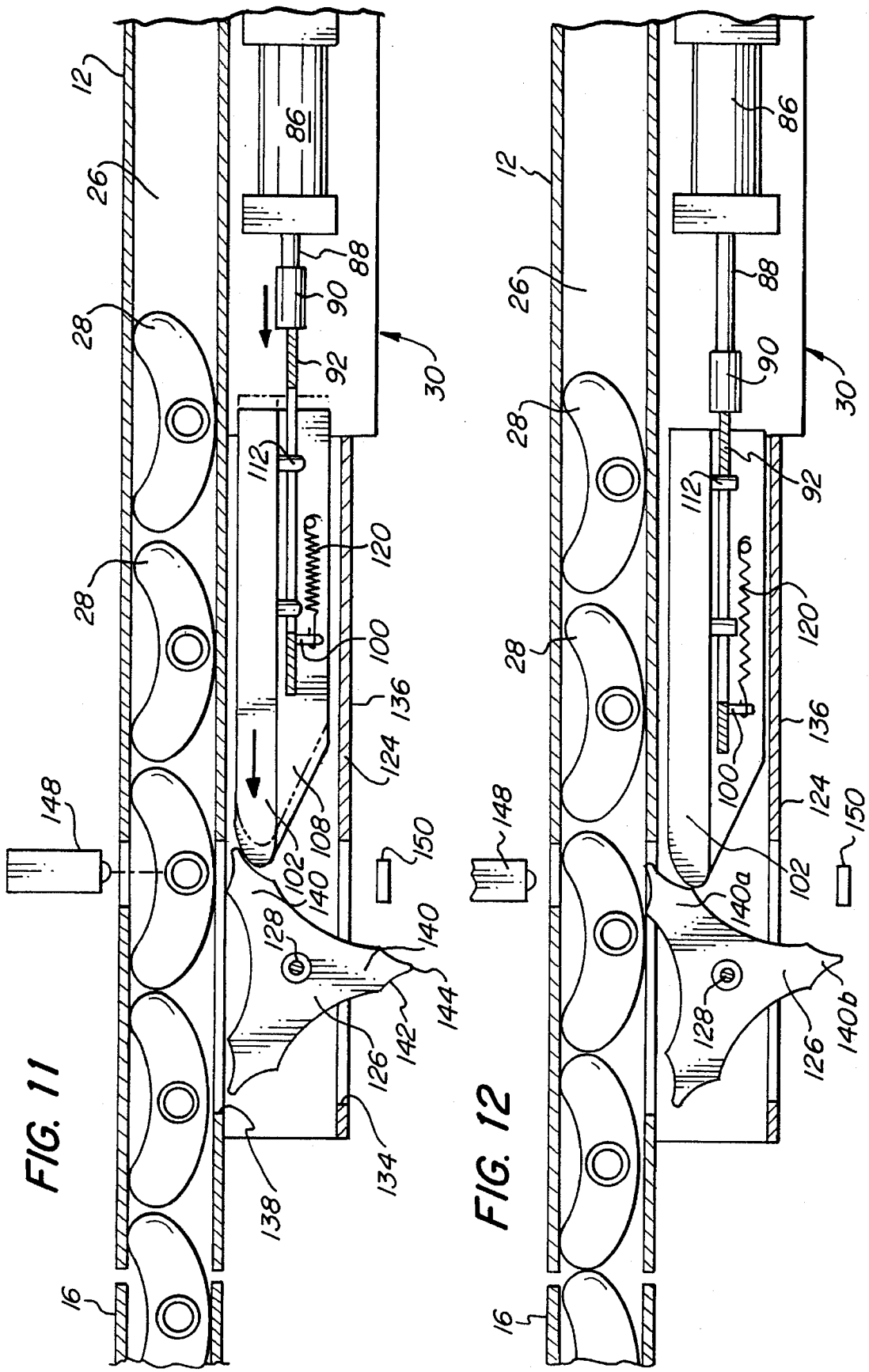

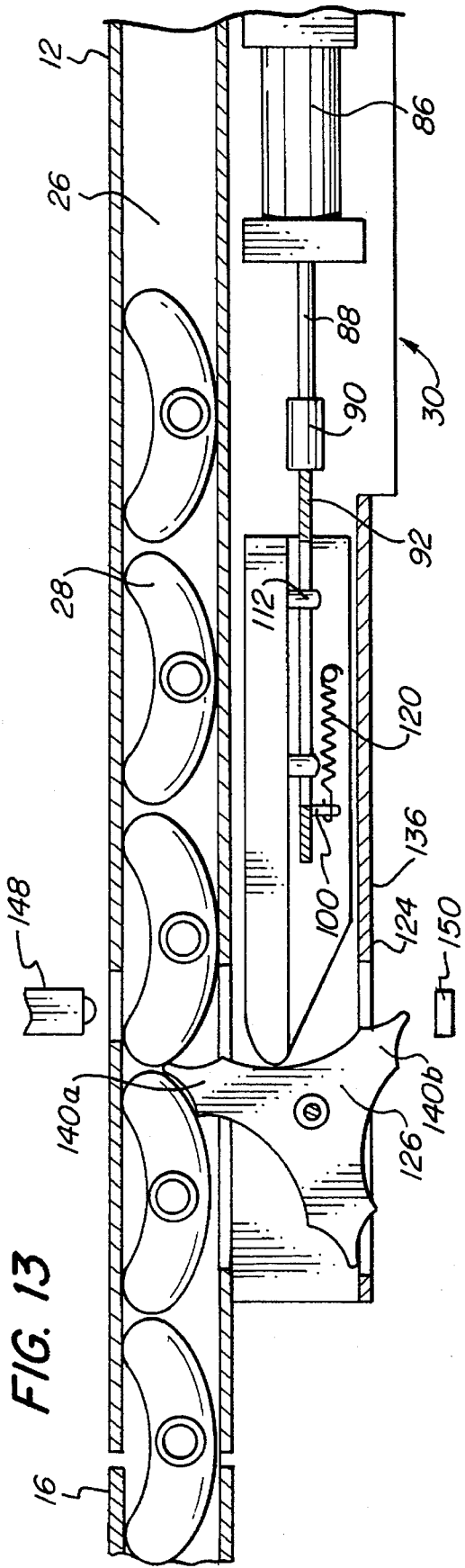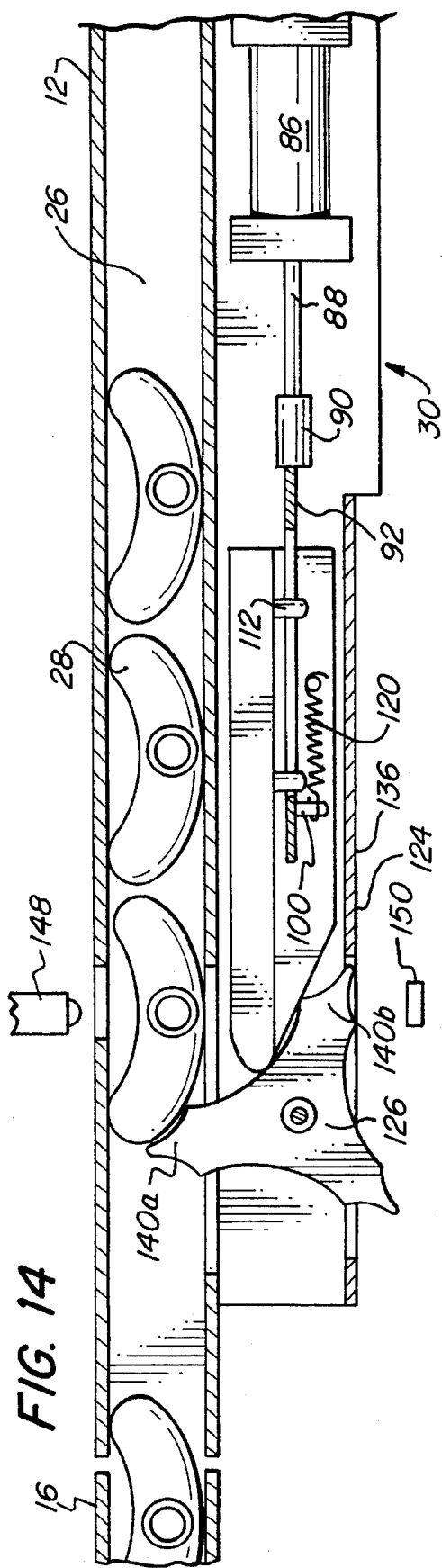

REGULATING ASSEMBLY AND CONVEYOR

This is a divisional of application Ser. No. 08/150,688, filed on Nov. 10, 1993, now U.S. Pat. No. 5,411,129 granted May 2, 1995.

BACKGROUND OF THE INVENTION

The present invention relates to a conveyor system for packaging machines, and, more particularly, to a conveyor system channelling containers into a multiplicity of lanes.

Manufacturers and bottlers utilizing bottles and like containers generally require a conveyor system which will evenly distribute bottles into a number of discharge lanes leading into case packing machinery or like equipment. Round bottles may be placed in a specific pattern on a conveyor belt at the intake end of the discharge lanes. As the belt carries them into the discharge lanes, they will retain the pattern, leading to proper distribution into the discharge lanes without special mechanical dividers. Non-round bottles, however, have inherent instability due to their irregular shape and generally will not distribute among the discharge lanes without a divider to properly space them.

Traditional mechanical dividers often provide a single pivotable intake lane for delivering a predetermined number of bottles into one of several parallel stationary discharge lanes, which is then pivoted into alignment with an adjacent discharge lane. Uniform distribution is obtained as the intake lane moves across the discharge lanes.

For the intake lane to change from one discharge lane to another without creating a jam, it is also desirable that the divider be provided with means to create a space between the bottles. The space must be dimensioned so as to allow sufficient time for the intake lane to move between adjacent discharge lanes.

Several mechanisms have been used to accomplish this separation. In one, a braking system temporarily narrows the width of the intake lane, thereby stopping the flow of bottles. In another, a star wheel or worm gear may contact each bottle and establish a spacing as the bottle moves thereby which is sufficient to permit a change in position of the intake lane. These control mechanisms may also be used to stop flow entirely when there is an adverse condition such as downstream overload.

Several problems have been noted with a divider system in which only the intake lane pivots. Because the intake lane must traverse the entire distance between the discharge lanes, the time for a lane change is substantial from one side to the other of the lane array. This requires a substantial space between bottles to avoid a jam. Additionally, the intake lane must be angled more greatly from the line of travel of the conveyor belt to align with the outermost discharge lanes. In this position, the driving force of the conveyor belt drives the bottles against the side of the intake lane, creating drag and potential bottle rotation. Both effects reduce the overall throughput of the divider system.

Moreover, when the intake lane is positioned at a substantial angle to the line of travel of the belt, there is a sharp angle between the intake lane and the discharge lanes which are aligned with the line of travel of the conveyor belt. A bottle traveling down the intake lane will undergo a substantial directional change to enter the outer discharge lane, which may cause bottle rotation. In this position, there is usually a resultant gap between the adjacent ends of the partition walls defining the intake lane and the discharge lane, increasing the likelihood of bottle rotation or jamming.

The traditional methods for creating the necessary bottle spacing produce their own set of problems. The above described braking systems must engage each time that the intake lane changes to a new discharge lane. This constant braking and releasing may permit the bottles to hit one another causing noise, possible glass fracture, and deformations of plastic containers. Additional problems include potential discharge of bottles from the conveyor and damage to their sides or labels.

Worm screw systems provide separation between every bottle and permit a lane change between any two adjacent bottles. However, the space around each bottle reduces overall system performance. Additionally, a different worm screw is needed for each bottle size, requiring repetitive part changes, expense, and the risk of part unavailability. The same problems arise when a conventional star wheel is used to provide separation between every bottle.

It is an object of the present invention to provide a novel lane divider assembly for bottles and the like which reduces the time required for an input lane to move into alignment with a new discharge lane, thereby reducing the spacing required between bottles.

It is also an object to provide such a lane divider assembly which includes means for briefly stopping bottles to establish separation therebetween.

It is a further object to provide such a lane divider assembly which reduces the angle of travel required of a bottle in the input lane relative to the line of travel of the conveyor belt.

It is another object to provide such a line divider assembly with reduced angles and gap between the adjacent ends of the input lane and discharge lanes.

SUMMARY OF THE INVENTION

It has now been found that the foregoing and related objects can be readily attained in a dual motion divider for articles moving along a conveyor belt having an intake lane defining member with elongated parallel spaced partition walls defining an intake lane for articles carried on an associated conveyor belt. The member is pivotable at its article receiving end in an arc extending transversely of the partition walls and movable at its other end along an axis parallel to the partition walls. A discharge lane defining member has a multiplicity of elongated parallel spaced partition walls defining a plurality of discharge lanes for articles carried on an associated conveyor belt. The discharge lane defining member is pivotable at its article discharging end in an arc extending transversely of the partition walls and movable at its other end along an axis parallel to the partition walls. The movable ends of the members are adjacent each other.

A drive assembly is connected to each of the lane defining members to move concurrently the movable ends in opposite directions and bring the intake lane into alignment with a predetermined one of the discharge lanes.

A regulating assembly is provided adjacent a point along the intake lane to permit a predetermined number of articles to pass a point in the intake lane before the intake lane is moved into alignment with a predetermined discharge lane.

Preferably, the lane defining members each include a pair of lane support members at the ends thereof and the partition walls are supported thereby.

Desirably, the lane support members at the movable ends of the lane defining members include a first slide member slidable on a first slide support member positioned above and extending transversely of the partition walls. A second slide member is operatively supported upon the first slide member and slidable on a second slide support member parallel to the partition walls. The slide members allowing the movable end of the lane defining members to move in an arc.

It is preferable that the drive means includes a pinion gear positioned between the movable ends of the lane defining members and rack gears mounted upon each of the movable ends. The rack gears engage opposite sides of the pinion gear and being movable as the pinion gear rotates to align the intake lane with a predetermined discharge lane.

The regulating assembly preferably has a star wheel rotatably mounted adjacent a point along the intake lane. The star wheel has not less than two nor more than three arms configured and dimensioned to be spaced from the intake lane and movable into the intake lane in the path of an associated article in the lane to restrain the associated article and create spacing between adjacent associated articles. A slidable nose member is positioned adjacent a first one of the arms of the star wheel to slidably engage the arm and rotate the star wheel, thereby causing the arm to move into the intake lane.

A second one of the arms is engageable with the nose member to prevent the first arm from rotating out of the intake lane after engagement of the first arm with an associated article. Preferably, the nose member is operatively actuated by a piston/cylinder assembly to move the nose member between a first position spaced from the first arm and a second position engaging the first arm. The member is operatively connected to the piston/cylinder by means of a spring whereby movement of the nose member is effected through the spring.

BRIEF DESCRIPTION OF THE DRAWINGS

FIG. 7 is a perspective view of the star wheel spacing assembly thereof, drawn to an enlarged scale, and shown mounted on a portion of the intake lane;

FIG. 8 is a plan view of the star wheel thereof, drawn to an enlarged scale;

FIG. 11 is a sectional view of the star wheel assembly along the line 11—11 of FIG. 7, including bottles and adjacent structure, and showing the nose engaging the star wheel to maintain it in a position outwardly of the intake lane line of travel, and with the retracted position of the nose shown in phantom line; and FIGS. 12–14 are views similar to FIG. 11, but showing the star wheel progressing into a bottle retarding position.

DETAILED DESCRIPTION OF THE PREFERRED EMBODIMENT

Figure 1:
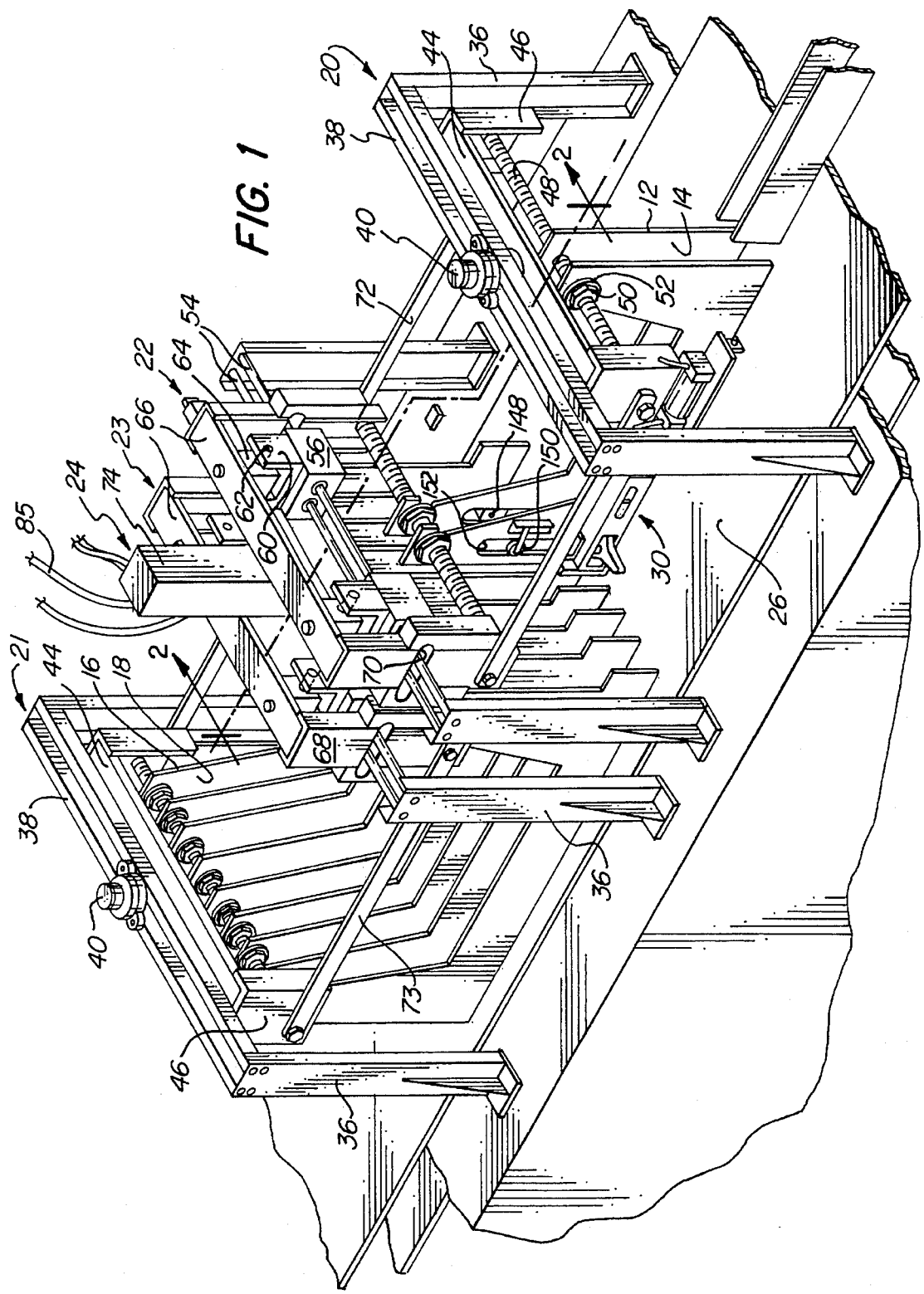
FIG. 1 is a perspective view of a dual motion lane divider assembly embodying the present invention, shown on a fragmentary illustrated conveyor.
Figure 2:
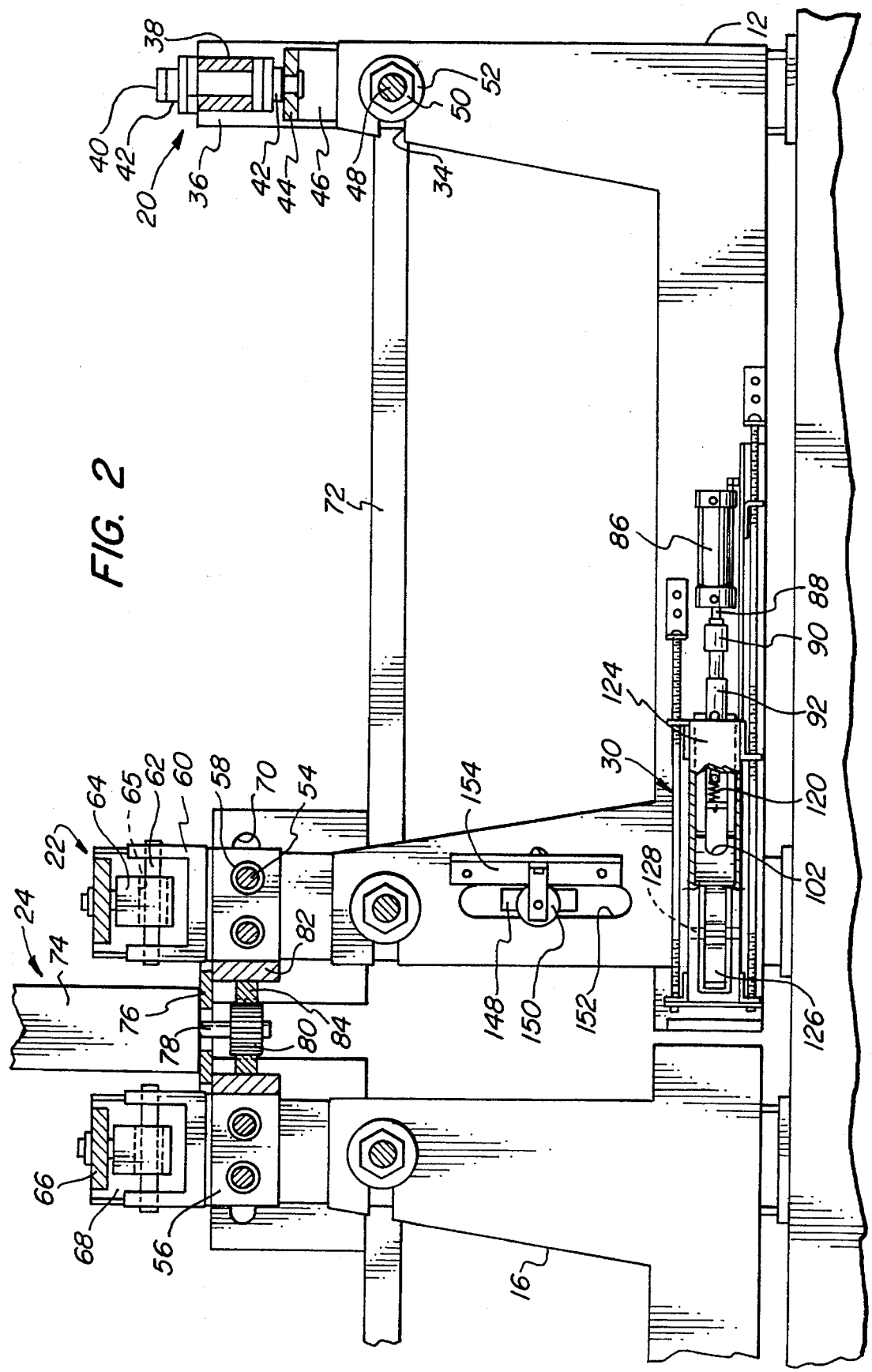
FIG. 2 is a fragmentary sectional view thereof along the line 2—2 of FIG. 1, drawn to an enlarged scale.

Turning first to FIGS. 1 and 2, a divider assembly embodying the present invention is illustrated therein as having a plurality of parallel spaced intake partition walls 12 and a plurality of parallel spaced discharge partition walls 16 forming an intake lane 14 and a plurality of discharge lanes 18, respectively. The lanes 14, 18 are for articles 28, seen in FIGS. 11–14, carried by a conveyor belt 26, the upper surface of which moves in the direction of the arrow in FIG. 1.

A pivotable intake lane support assembly generally designated by the numeral 20 supports the upstream ends of the intake partition walls 12, while the pivotable discharge lane support assembly 21 supports the downstream ends of the discharge partition walls 16.

A slidable intake lane support assembly generally designated by the numeral 22 supports the downstream ends of the intake partition walls 12, while the slidable discharge lane support assembly 23 supports the upstream ends of the discharge partition walls 16. The slidable lane support assemblies 22, 23 allow those ends to swing in arcs in a plane parallel to the plane of the conveyor belt 26.

The pivotable lane support assembly 20 and the slidable lane support assembly 22 which support the intake partition walls 12 are joined to each other by support brackets 72 to maintain the intake partition walls 12 in a parallel spaced relationship. The discharge partition walls 16 are maintained in a parallel spaced relationship in the same manner by brackets 73.

A drive assembly generally designated by the numeral 24 is connected to each of the slidable lane support assemblies 22, 23 and permits the downstream ends of the intake partition walls 12 and the upstream ends of the discharge partition walls 16 to move simultaneously equal distances in opposing directions. This permits the intake lane 14 to align with a designated discharge lane 18, both closely in spacing and in axial orientation.

A star wheel assembly generally designated by the numeral 30 is supported on the outwardly facing surface of one of the intake partition walls 12 and permits a predetermined number of articles 28 to pass a given point in the intake lane 14 before the lane 14 is moved to engage the next designated discharge lane 18.

As best seen in FIGS. 1 and 2, both the intake partition walls 12 and the discharge partition walls 16 are spaced slightly above the conveyor belt 26 and extend vertically upwardly. The end portions of the partition walls 12, 16 are substantially higher than the intermediate portion to facilitate fastening of the partition walls 12, 16 to the support assemblies 20, 21 and 22, 23. Adjacent the upper margins of the end portions of the partition walls 12, 16 are mounting slots 34 for seating on the support assemblies 20, 21 and 22, 23.

The pivotable lane support assemblies 20, 21 include a pair of upstanding support legs 36 which are positioned to the sides of the conveyor belt 26 and support a pair of parallel spaced horizontal upper support bars 38 which are positioned above and extend transversely of the conveyor belt 26. Spaced below and pivotably supported on the upper support bars 38 by the pivot member 40 and an opposing set of flanged bearings 42 is a mounting bracket comprised of the horizontal member 44 and depending legs 46. A threaded rod 48 has its ends seated in the legs 46 and is spaced below the horizontal member 44 of the bracket and it extends through the mounting slots 34 of the upstream ends of the intake partition walls 12 and the downstream ends of the discharge partition walls 16. Washers 52 and nuts 50 secure these ends of the walls 12, 16 in fixed positions along the length of the rod 48.

Referring to FIGS. 1–3 and 6, each slidable lane support assembly 22, 23 has a pair of upstanding support legs 36 positioned to the sides of the conveyor belt 26, and supporting the ends of the parallel spaced slide rods 54. A pair of lower slide blocks 56 is slidably mounted in spaced relationship on the slide rods 54 and have bushings 58 in the bores 59 through which the slide rods 54 extend.

A yoke 60 is mounted on the upper surface of the slide blocks 56 so that the web portion thereof extends in the direction of movement of the conveyor belt 26. The legs of the yoke 60 seat the ends of an upper slide rod 62 which extends at a right angle to the slide rods 54 and which extend through a bore 65 in the slide block 64 for relative slidable movement parallel to the line of travel of the conveyor belt 26. Pivotably mounted on the upper surfaces of the upper slide blocks 64 is a horizontal support bar 66 for pivotal movement in a plane parallel to the plane of the conveyor belt 26. Depending from the ends of the support bar 66 are rod support brackets 68 having horizontally extending slots 70 through which the slide rods 54 extend. The horizontal slot 70 is dimensioned so that the slide rods 54 will not contact the support brackets 68 as the support bar 66 rotates relative to the slide rods 54. A threaded rod 48 extends between the rod support brackets 68 parallel to the support bar 66, and through the mounting slots 34 on the downstream ends of the intake partition walls 12 or the upstream ends of the discharge partition walls 16. Washers 52 and nuts 50 secure the ends of the walls 12, 16 in a fixed position along the length of the rods 48.

On each side of the intake partition walls 12, connector bars 72 extend between brackets 46, 68 of the support assemblies 20, 22 respectively. On each side of the discharge partition walls 16, the support brackets 46, 68 are connected in the same fashion by connector bars 73. The connector bars 72, 73 maintain the parallel spaced relationship of the partition walls 12, 16.

Referring in detail to FIG. 1–3 and 6, the drive assembly 24 is generally positioned between the two adjacent slidable lane support assemblies 22, 23. The servomotor 74 is mounted upon the platform 76 which extends between the support legs 36.

The shaft 78 extends downwardly from the servomotor 74 and has a pinion gear 80 thereon which meshes with rack gears 84 on opposite sides thereof, and the rack gears extend transversely of the path of travel of the belt 26. The rack gears 84 are mounted on rack support bars 82 which are fastened to the lower slide blocks 56 of the slidable lane support assembly 22, 23.

Lead wires 85 connect the servomotor 74 to a computer control system (not shown) for accurate positioning of the intake lane 14 with respect to the discharge lanes 18 as will be described more fully hereinafter.

As seen in FIGS. 7–14, the star wheel assembly 30 is mounted on the outwardly facing surface of one of the intake partition walls 12 and it has a pneumatic cylinder 86 which extends along the outwardly facing surface of the intake partition wall 12. The piston rod 88 extends downstream from the cylinder 86 and connects the coupler 90 to an actuator 92 which has a generally cylindrical portion 94 where it is fastened to the coupler 90, and an elongated flat portion 96 extending downstream thereof.

Thus, the longitudinal axis of the flat portion 96 is coaxial with the axis of the piston rod 88. An elongated horizontal slot 98 extends along most of the length of the flat portion 96 of the actuator 92, and a pin 100 is mounted on the front surface of the flat portion 96 forwardly of the slot 98.

Mounted on the actuator 92 is an elongated nose or stop member 102 which has its front surface 104 and back surface 106 converging at its forward end to form a rounded abutment portion 108. A groove 110 with a rectangular cross section extends from the rearmost margin of the front surface 104 to a point adjacent the forwardmost margin of the front surface 104. A pair of spaced pins 112 extends horizontally from the base 114 of the groove 110, and a pin 118 extends vertically between the side walls 116 of the groove 110. The nose 102 and the actuator 92 are assembled with the flat portion 96 of the actuator 92 lying in the groove 110 of the nose 102, and with the pins 112 on the bottom wall 114 of the groove 110 seating in the slot 98 of the actuator 92. The forward and rearward motion of the actuator 92 is translated to the nose 102 solely by means of a spring 120 which extends from the pin 100 on the actuator 92 to the transverse pin 118 on the nose 102. The pins 112 on the nose 102, the slot 98 on the actuator 92, and the spring 120 are dimensioned and configured so that the forwardmost pin 112 will be engaged by the forwardmost portion of the slot 98 on the actuator 92 for positive engagement between the actuator 92 and the nose 102 when the piston rod 88 is retracted. However, the rearmost pin 112 of the nose 102 rarely contacts the rearmost portion of the slot 98 of the actuator 92. Accordingly, as the piston rod 88 is extended, the actuator 92 will move in a forward, downstream direction. The spring 120 will begin to extend until the force of the spring is sufficient to move the nose 102 in the same direction.

A housing 124 with a generally U-shaped cross section is mounted on the outer surfaced of the intake partition wall 12, and the actuator 92 and nose 102 extend into the housing 124 through its rearmost end.

A star wheel 126 is rotatably mounted on a vertical shaft 128 extending between the upper wall 130 and the lower wall 132 of the housing 124 adjacent its forward end. As seen in FIGS. 11–14, a rectangular slot 134 in the front wall 136 of the housing 124 is aligned with a rectangular slot 138 in the partition wall 12 to allow free rotation of the star wheel 126 therein and extension of the star wheel into the path of the bottles 28 in the intake lane.

As best seen in FIG. 8, the star wheel 126 has three identically shaped arms 140, and is pivotable about the axis defined by the bore 141.

The sides of each arm 140 have concave surfaces 142 adjacent their outer ends and join to form a rounded tip 144.

Adjustably threaded support assemblies 146 are provided to permit adjustment of the position of the housing 124 relative to the opening in the wall 12.

As best seen in FIGS. 1 and 2, the intake partition walls 12 has aligned vertical slots 152 above the housing 124 of the star wheel assembly 30. Adjacent the vertical slot 152 in one wall 12 is a bracket 154 supporting a reflector 150 in a position aligned with the slot 152. Mounted on the other wall 12 is a photoelectric sensor 148 which is aligned with the slots 152 and the reflector 150. This photoelectric sensor 148 is connected to the computer control system (not shown) and counts the number of bottles passing along the intake lane 14.

In using the dual motion divider for non-round bottles 10, information is provided to the computer control system (not shown). Such information includes the dimensioning and configuration of the bottles, the number of discharge lanes, the number of bottles desired per discharge lane, and the relative controlled positions and sequence of positioning for the movement of both the intake lane and the discharge lanes.

A multiplicity of bottles 28 are directed into the intake lane 14 upstream of the dual motion divider of the present invention. The applicable downstream equipment (not shown) such as a carton packer is then actuated.

Once the conveyor belt 26 is started, the bottles 28 begin to pass the photoelectric sensor 148 and a counting sequence is commenced. Specifically, the photoelectric sensor utilizes polarized light to allow even a clear bottle to break the photoelectric beam.

Once a predetermined number of articles 28 have passed the photoelectric sensor 148, the star wheel assembly 30 is actuated. As seen in FIG. 11, the star wheel 126 begins in a position where all of its arms 140 are outside of the intake lane 14, which is possible since the star wheel 126 has only three segments 140. Actuation of the star wheel assembly 30 begins with the pneumatic cylinder 86 extending the piston rod 88 in a forward or downstream direction. Through the coupler 90, the actuator 92 is also moved in the same direction, and the movement of the pin 100 away from the vertical pin 118 of the nose 102 expands the spring 120 until it exerts sufficient force to cause the nose 102 to move in a forward or downstream direction from the position shown in phantom line to the position shown in solid line. As previously stated, the nose 102 advances only by reason of the force of spring 120. In its forward position, the nose 102 begins to engage the closest arm 140 of the star wheel 126, and specifically concave surface 142 thereon.

Referring to FIG. 12, as the nose 102 continues to move in a forward or downstream direction, it causes the star wheel 126 to rotate and the contacted arm 140a to contact the side of a passing bottle 28. The use of the spring 120 as the sole means of advancing nose 102 prevents the application of substantial force on the side of the bottle 28 and the potential for jamming.

Referring next to FIG. 13, as the engaged bottle 28 continues to move down the conveyor belt 26, the arm 140a of the star wheel 126 begins to work into the gap between the contacted bottle 28 and the bottle 28 which follows.

Referring next to FIG. 14, the movement of the bottles 28 causes the star wheel 126 to continue to rotate until the arm 140b, following the segment 140a in the lane, abuts the nose 102 and locks the initial arm 140a in a path of the bottles 28 in the intake lane 14, to create a gap between the bottles 28.

Figure 3:
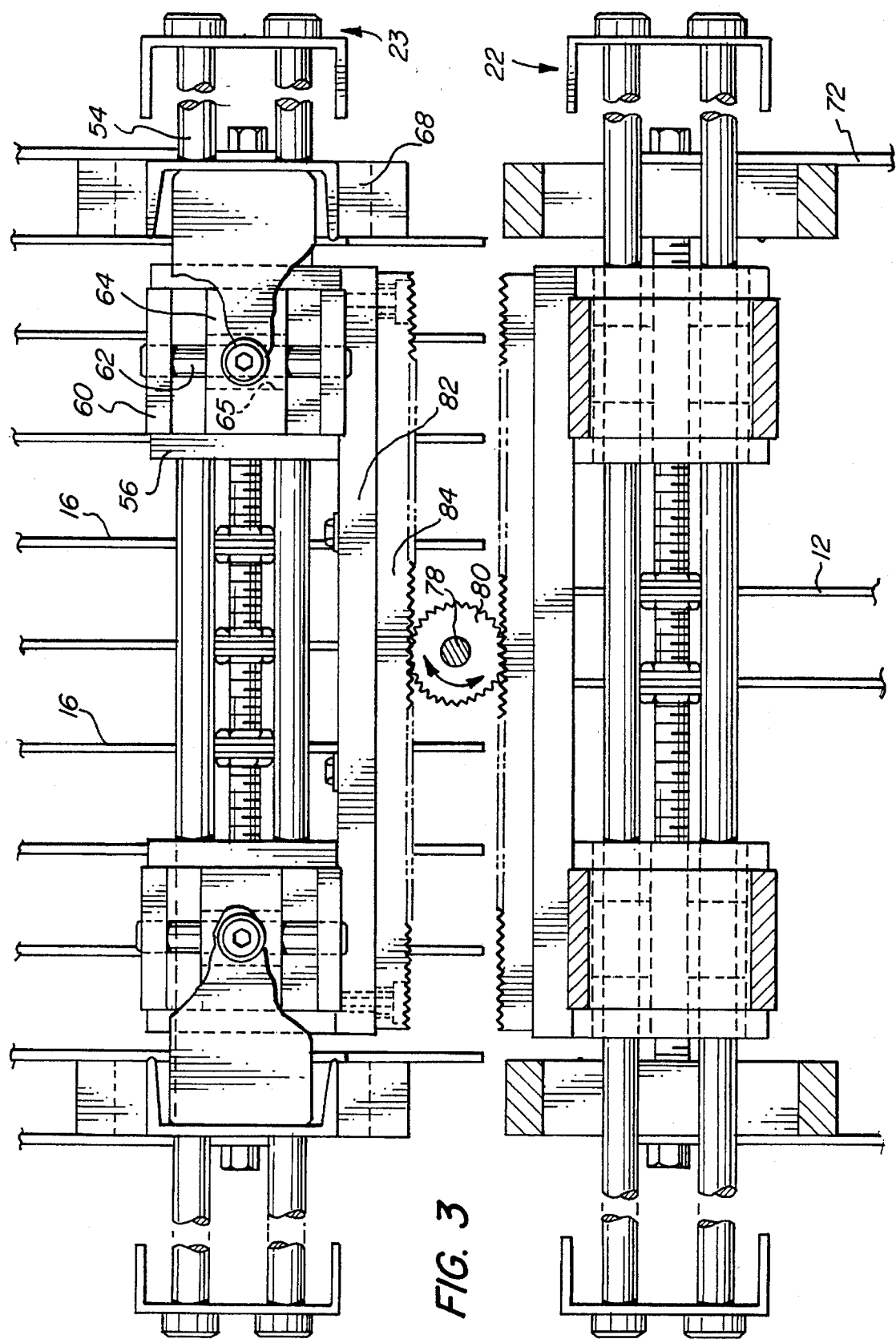
FIG. 3 is a fragmentary plan view of the slide assemblies thereof, and with portions broken away to show internal detail.
Figure 4:
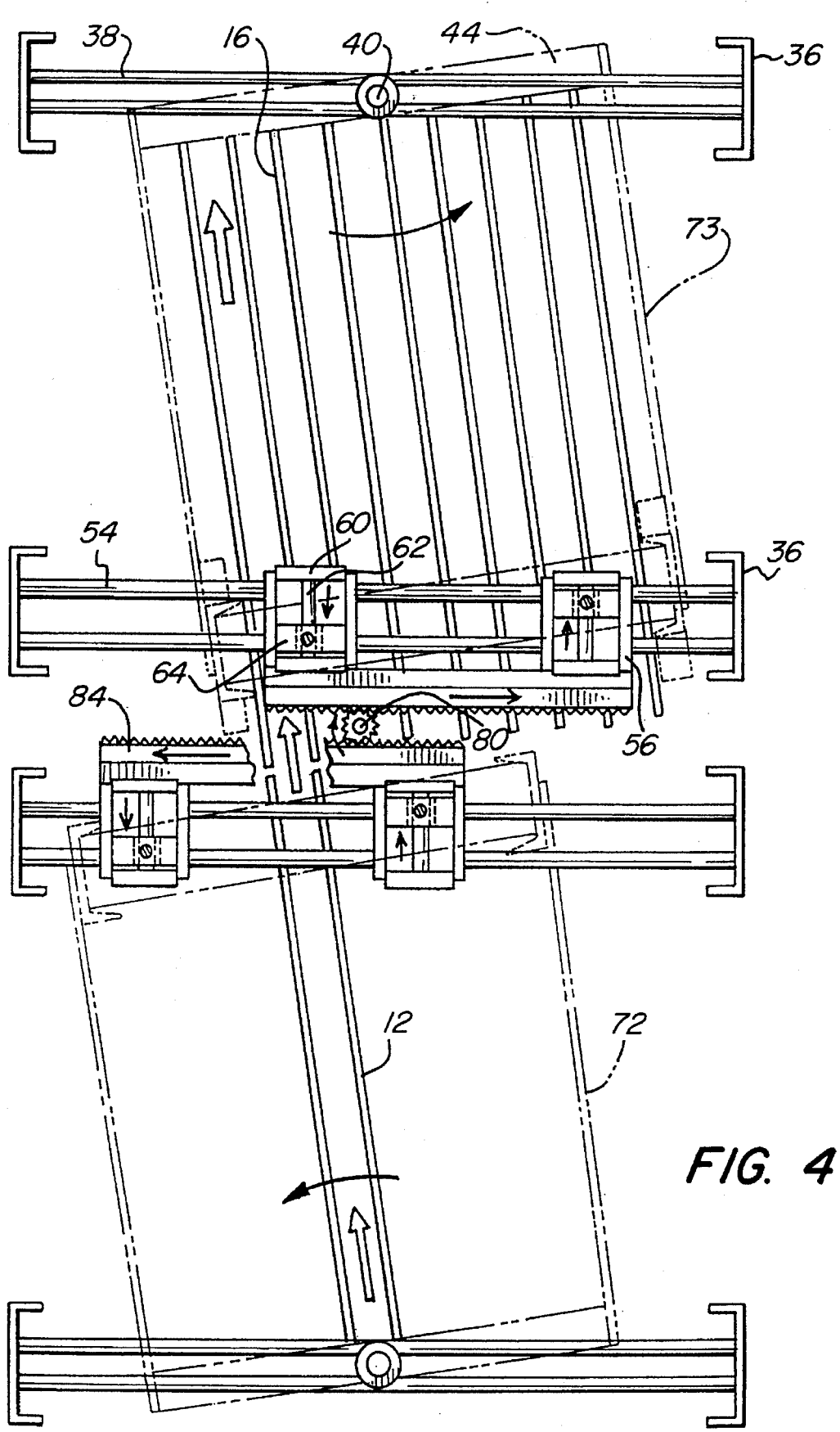
FIG. 4 is a partially schematic plan view of the intake lane thereof aligned with an outermost discharge lane, with lane support structure shown in phantom line.
Figure 5:
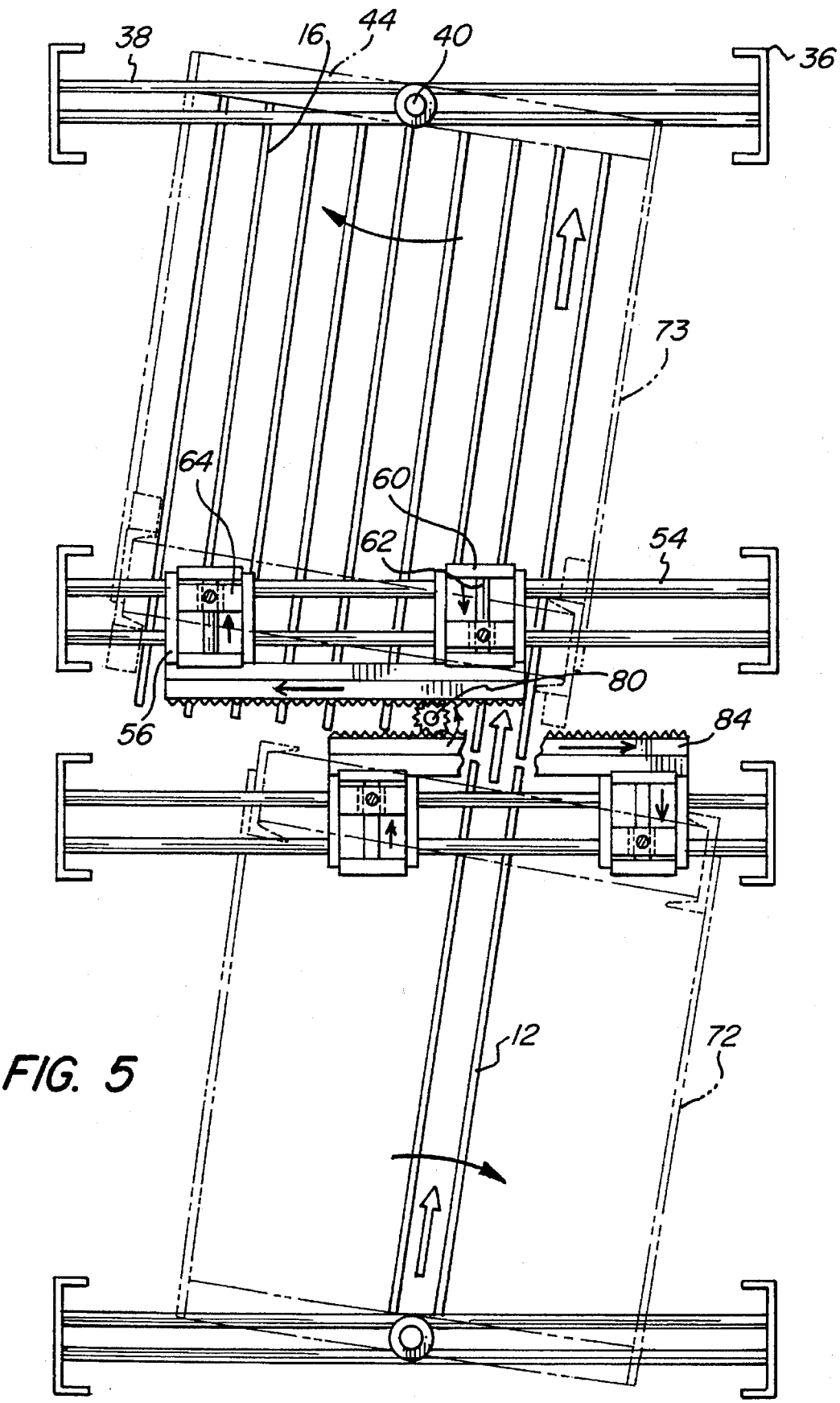
FIG. 5 is a view similar to FIG. 4, but with the intake lane aligned with the other outermost discharge lane.
Figure 6:
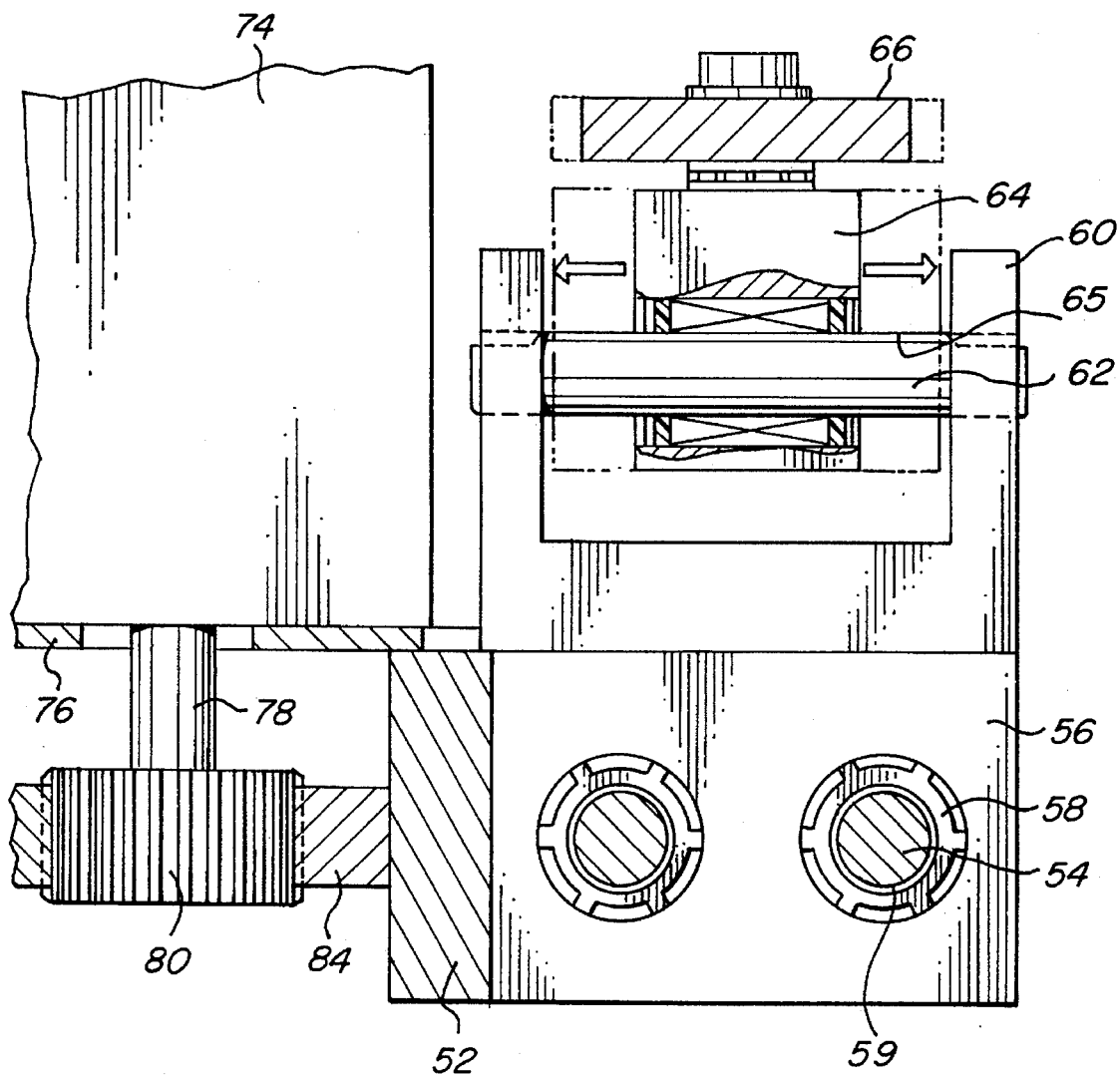
FIG. 6 is fragmentary view of one of the slide assemblies and the drive assembly of FIG. 2 with portions broken away to show detail, and drawn to an enlarged scale.
Figure 9:
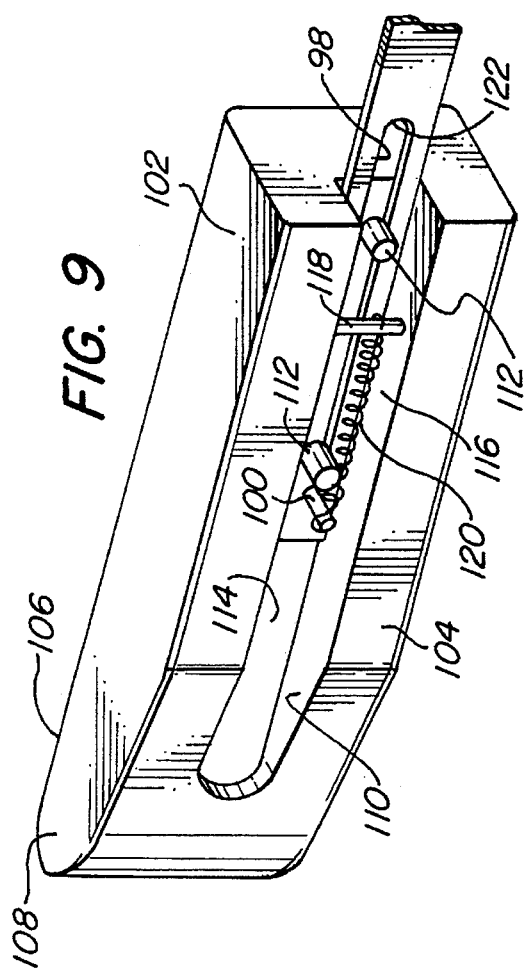
FIG. 9 is a perspective view of the nose portion of the star wheel spacing assembly, drawn to an enlarged scale, showing a spring and a portion of the actuator.
Figure 10:
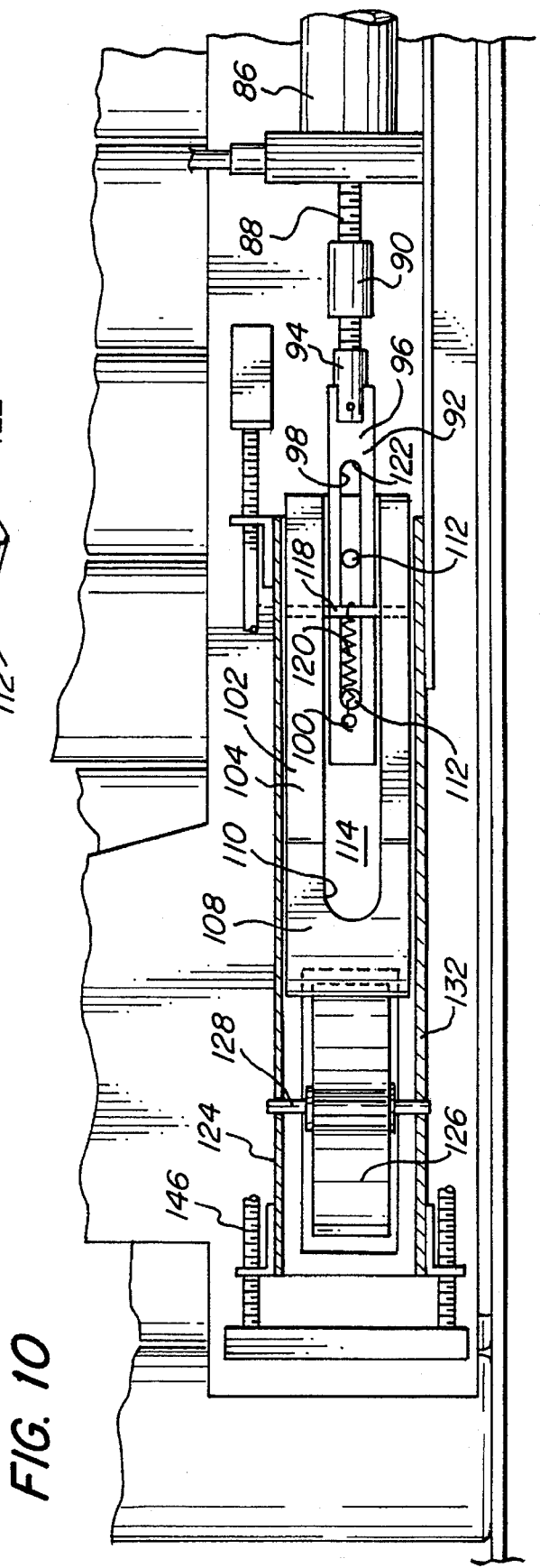
FIG. 10 is a fragmentary side elevational view of the star wheel spacing assembly, drawn to an enlarged scale, with parts broken away to show internal detail.

Referring to FIGS. 3–5, once the gap between the bottles 28 reaches the interface between the intake lane 14 and the discharge lanes 18, the computer control system (not shown) actuates the servomotor 74 which in turn rotates the pinion gear 80 causing the rack gears 84 to move in equal and opposite directions. Movement of the rack gears 84 which are mounted on the lower slide blocks 56, causes them to move along the slide rods 54. The upper slide blocks 64 move along the upper slide rods 62 to compensate for the fact that all points on the slide rods 54 are not equidistant from the pivot member 40. The movement of the lower slide blocks 56, upper slide blocks 64, and related structure causes movement and proper alignment of the intake lanes 14 and discharge lanes 18. When the lanes are aligned, the intake partition walls 12 and discharge partition walls 16 will be substantially aligned.

Once the partition walls 12, 16 have been moved to their new location, the computer control system (not shown) actuates the cylinder 86 to retract the piston rod 88 and thereby draws the actuator 92 rearwardly or in an upstream direction. When the actuator 92 moves in this direction, the forwardmost pin 112 on the nose 102 is engaged by the forwardmost portion of the slot 98 on the actuator 92, and the nose 102 is withdrawn. Once the nose 102 is spaced from the blocked arm 140b of the star wheel 126, the star wheel 126 is again free to rotate out of the intake lane 14, and the bottles 28 resume their normal travel and spacing.

Optionally, numerous control systems known in the art may be employed with the dual motion divider of the present invention. By way of example, an additional photoelectric sensor may be employed to assure that there is a gap in the bottles 28 at the juncture of the intake partition walls 12 and discharge partition walls 16, prior to actuation of the servomotor 74 and attendant movement of the partition walls 12, 16. Additionally, an interlock system may be provided to prevent release of the star wheel 126 from a blocking position if the motor operating the downstream equipment, such as the case packer, is not operating. Further, a sensor may be employed to detect a high level of bottles downstream of the dual notion divider and prevent further flow past the star wheel assembly 30. Finally, a detector may be used in the upstream position from the dual motion divider to verify that there is a sufficient supply of articles in the intake lane 14.

Although reference is made to non-round bottles throughout this specification, the dual motion divider 10 may be employed for the other types of articles as well.

Although the illustrated embodiment utilizes only a single intake lane, two or more intake lanes may be provided, albeit with some greater complexity of control in the lanes to be aligned.

Thus, it can be seen from the foregoing detailed specification and attached drawings that the novel dual motion divider of the present invention provides a reduction in the amount of time required for an input lane to move to a new discharge lane and reducing the necessary spacing between the bottles. The separation means is employed to briefly stop a single bottle. Additionally, the dual motion divider reduces the maximum angle of travel required of a bottle in the input lane and provides reduced angular deviation and gap between the partition walls of the input lane and a designated discharge lane.

Having thus described the invention, what is claimed is:

1. A regulating assembly for an intake lane of a conveyor belt system for carrying articles, said assembly comprising:

(a) a star wheel rotatably mounted adjacent a point along said intake lane and having not less than two nor more than three arms configured and dimensioned to be spaced from said intake lane and movable into said intake lane in the path of an associated article in said lane to restrain said associated article and create spacing between adjacent associated articles; and (b) a slidable nose member positioned adjacent a first one of said arms of said star wheel to slidably engage said arm and rotate said star wheel, thereby to cause said arm to move into said intake lane, a second one of said arms of said star wheel being engageable with said nose member to prevent said first arm from rotating in to the intake lane after engagement of said first arm with an associated article.

2. The regulating assembly in accordance with claim 1 wherein said nose member is operatively actuated by a piston/cylinder assembly to move said nose member between a first position spaced from said first arm and a second position engaging said first arm.

3. The regulating assembly in accordance with claim 2 wherein said member is operatively connected to said piston/cylinder by means of a spring whereby movement of said nose member is effected through said spring.

\* \* \* \* \*